United States Patent
Lindberg et al.

(10) Patent No.: US 11,373,399 B2
(45) Date of Patent: Jun. 28, 2022

(54) METHOD OF CROP ANALYSIS USING DRONE WITH FLYING AND DRIVING CAPABILITY

(71) Applicants: Hall Enterprise LLC, Paso Robles, CA (US); Jacob Paul Lindberg, San Luis Obispo, CA (US); Kaveh Nemati, San Luis Obispo, CA (US)

(72) Inventors: Jacob Paul Lindberg, San Luis Obispo, CA (US); Kaveh Nemati, San Luis Obispo, CA (US)

(73) Assignees: Hall Enterprise LLC, Paso Robles, CA (US); Jacob Paul Lindberg, San Luis Obispo, CA (US); Kaveh Nemati, San Luis Obispo, CA (US)

( * ) Notice: Subject to any disclaimer, the term of this patent is extended or adjusted under 35 U.S.C. 154(b) by 394 days.

(21) Appl. No.: 16/523,865

(22) Filed: Jul. 26, 2019

(65) Prior Publication Data

US 2020/0034616 A1    Jan. 30, 2020

Related U.S. Application Data

(60) Provisional application No. 62/703,783, filed on Jul. 26, 2018.

(51) Int. Cl.
| | |
|---|---|
| *G06K 9/00* | (2022.01) |
| *G06V 20/10* | (2022.01) |
| *B64C 39/02* | (2006.01) |
| *G06Q 50/02* | (2012.01) |
| *G01J 3/28* | (2006.01) |

(52) U.S. Cl.
CPC ......... *G06V 20/188* (2022.01); *B64C 39/024* (2013.01); *G06Q 50/02* (2013.01); *B64C 2201/127* (2013.01); *G01J 2003/2826* (2013.01); *G06T 2207/10004* (2013.01); *G06T 2207/30188* (2013.01)

(58) Field of Classification Search
CPC ............. G06K 9/00657; G06K 9/0063; G06K 2009/00644; G06K 2009/4657; G06T 2207/30188; G06T 2207/10036; G06T 7/00

See application file for complete search history.

(56) References Cited

U.S. PATENT DOCUMENTS

| | | | |
|---|---|---|---|
| 9,945,828 B1 * | 4/2018 | Poling | G06T 7/0004 |
| 2016/0050840 A1 * | 2/2016 | Sauder | G06K 9/00657 701/3 |
| 2016/0157414 A1 * | 6/2016 | Ackerman | A01B 69/008 701/25 |
| 2016/0334276 A1 * | 11/2016 | Pluvinage | B64C 39/024 |
| 2017/0031365 A1 * | 2/2017 | Sugumaran | B64C 39/024 |

(Continued)

*Primary Examiner* — Guillermo M Rivera-Martinez
(74) *Attorney, Agent, or Firm* — Stetina Brunda Garred and Brucker

(57) ABSTRACT

There is provided method of analyzing a field of crops using a drone. The method initially includes remotely controlling the drone to fly the drone to adjacent the field of crops. The method further includes remotely controlling the drone to land the drone adjacent the crops. The method further includes remotely controlling the drone to drive the drone on the ground along the crops. The method further includes capturing ground-based images of the crops at an upward view angle using a multispectral camera on-board the drone.

26 Claims, 5 Drawing Sheets

(56) References Cited

U.S. PATENT DOCUMENTS

| | | | |
|---|---|---|---|
| 2017/0032509 A1* | 2/2017 | Mannar | G06T 7/73 |
| 2017/0199528 A1* | 7/2017 | Detweiler | A01M 21/00 |
| 2017/0264833 A1* | 9/2017 | Barnes | H04N 7/181 |
| 2017/0359943 A1* | 12/2017 | Calleija | A01M 7/006 |
| 2017/0372137 A1* | 12/2017 | Kumar | G06T 17/05 |
| 2018/0129879 A1* | 5/2018 | Achtelik | B64C 39/024 |
| 2018/0259496 A1* | 9/2018 | McPeek | G01N 33/025 |
| 2018/0307906 A1* | 10/2018 | Nelson | H04N 9/097 |
| 2018/0364157 A1* | 12/2018 | Ghiraldi | A01C 21/007 |
| 2019/0303668 A1* | 10/2019 | King | H04W 4/80 |
| 2019/0333292 A1* | 10/2019 | Chan | G07C 5/0808 |

* cited by examiner

METHOD OF CROP ANALYSIS USING DRONE WITH FLYING AND DRIVING CAPABILITY

CROSS-REFERENCE TO RELATED APPLICATIONS

The present application is a non-provisional patent application of and claims priority to U.S. Provisional Patent App. Ser. 62/703,783, filed on Jul. 26, 2018, entitled METHOD OF CROP ANALYSIS USING DRONE WITH FLYING AND DRIVING CAPABILITY, the entire contents of which are incorporated herein by reference.

STATEMENT RE: FEDERALLY SPONSORED RESEARCH/DEVELOPMENT

Not Applicable

BACKGROUND

1. Technical Field

The present disclosure relates generally to analysis of crops. More particularly, the present disclosure relates to a method of analyzing crops using a drone.

2. Related Art

The use of aerial drone technology has permeated numerous industries, including the agricultural industry. The use of drone technology has increased as the costs of deploying them decreased over time. Aerial drones are used to survey fields to obtain visual images of fields of crops. The flight capabilities allow for a means to readily obtain data and avoid having surveyors physically walk the field, which can be a time consumptive and potentially inaccurate process.

In view of the foregoing, there is a need in the art for an improved method of analyzing crops using drone technology.

BRIEF SUMMARY

In accordance with one embodiment, there is provided a method of analyzing a field of crops using a drone. The method initially includes remotely controlling the drone to fly the drone to adjacent the field of crops. The method further includes remotely controlling the drone to land the drone adjacent the crops. The method further includes remotely controlling the drone to drive the drone on the ground along the crops. The method further includes capturing ground-based images of the crops at an upward view angle using a multispectral camera on-board the drone.

According to various embodiments, the method may include capturing flight images of the field of crops, while flying, using the multispectral camera. The captured flight images may be based upon visible light images and infrared images. A Normalized Difference Vegetation Index (NDVI) map may be produced using the captured flight images. The remotely controlling the drone to land the drone adjacent the crops may be at a location based upon the NDVI map. The method may include transmitting the captured flight images. The method may include rotating the multispectral camera to an upward view angle. The captured ground-based images may be based upon visible light images and thermal images. The method may further include using the captured ground-based images to identify crops. The method may further include using the captured ground-based images to determine a temperature value of the identified crops. The method may further include sensing a humidity value of the crops. The humidity value of the crops may be sensed using a hygrometer on-board the drone. The crops may be arranged in rows, and the method may include controlling the drone to drive the drone on the ground along a row of the crops. The captured ground-based images may include video images. The method may further include sensing an environmental characteristic of the ground adjacent the crops by deploying a ground probe into the ground from on-board the drone. The environmental characteristic may be a pH value or a moisture value.

According to another embodiment, there is provided a method of analyzing a field of crops using a drone. The method includes remotely flying the drone to fly the drone to adjacent the field of crops. The method further includes capturing flight images of the field of crops, while flying, using a multispectral camera. The method further includes remotely landing the drone adjacent the crops. The method further includes remotely driving the drone on the ground along the crops. The method further includes rotating the multispectral camera to an upward view angle. The method further includes capturing ground-based images of the crops at an upward view angle using the multispectral camera on-board the drone.

According to various embodiments, the captured flight images are based upon visible light images and infrared images. The captured ground-based images are based upon visible light images and thermal images. The method may further include sensing an environmental characteristic of the ground adjacent the crops by deploying a ground probe into the ground from on-board the drone. The environmental characteristic may be a pH value or a moisture value.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
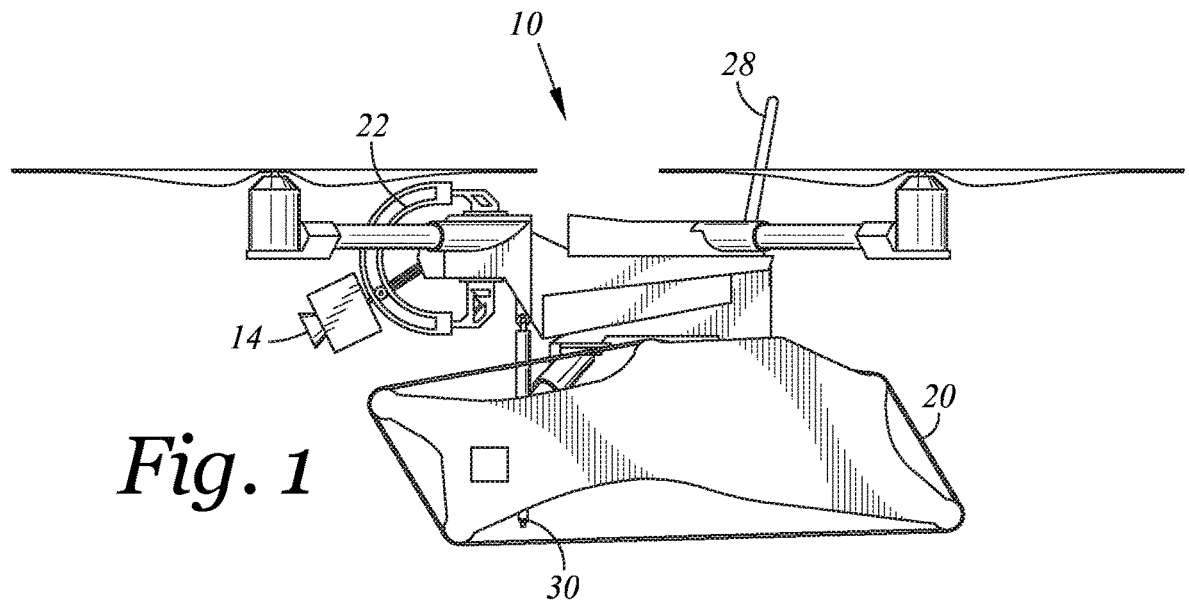
FIG. 1 is a symbolic side view of a drone as may be used in the method of according to an embodiment of the invention.

Referring now to FIG. 1, there is a symbolic side view of a drone 10 as may be used in the method of according to an embodiment of the invention. In this example, the drone 10 is a four rotor drone 10. However, the drone 10 may include any number of rotors and is only required to be able be remotely controlled to fly. With respect to the remote operation of the drone 10, the drone 10 may be selected from those which are well known to one of ordinary skill in the art. It is contemplated that flight operations of the drone 10 would use certain drone software and related hardware (including appropriate remote control instrumentality and displays). Other details of the drone 10 and its on-board capabilities are discussed below.

Figure 2:
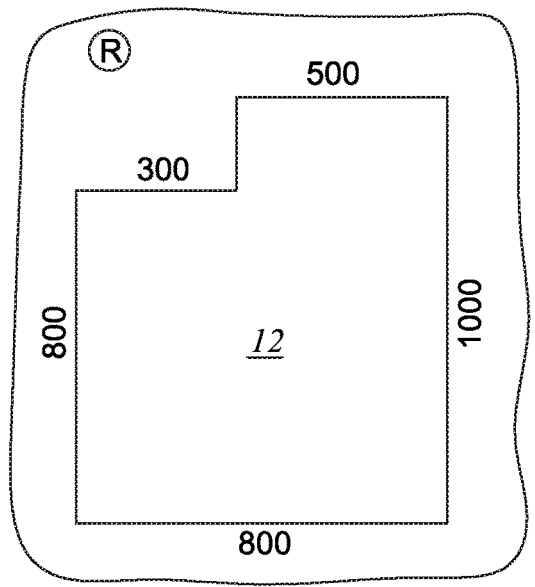
FIG. 2 is a symbolic top view of a portion of the field of crops with a remote operator R.

Referring now to FIG. 2 there is depicted a top symbolic view of a portion of the field of crops 12 with a remote operator R. The remote operator R is contemplated to be positioned adjacent the field of crops 12 where it is desired to deploy the drone 10. However, the remote operator R may even be located at some distant location as well, with the drone 10 launched into flight from such distant location or the drone 10 being initially deployed adjacent the field of crops 12, or otherwise. In any event, it is contemplated that the drone 10 may be flown adjacent the field of crops 12 over some desired terrain as operated by the remote operator R that interacts with the drone software and related hardware.

Figure 3:
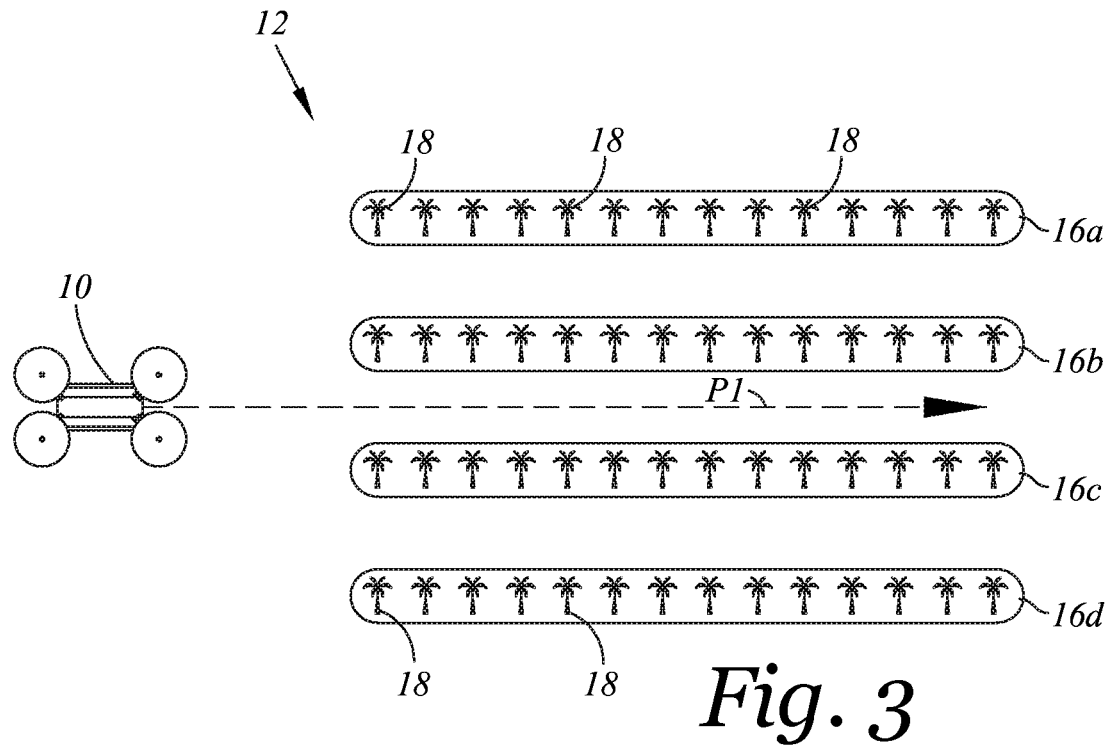
FIG. 3 is a symbolic top view of a portion of the field of crops of FIG. 1 with the drone flying.

In accordance with one embodiment, there is provided method of analyzing the field of crops 12 using the drone 10. The method initially includes remotely controlling the drone 10 to fly the drone to adjacent the field of crops 12. Referring now to FIG. 3 there is depicted a symbolic top view of a portion of the field of crops 12 of FIG. 1. The field of crops 12 may be arranged on rows 16a-d with individual crops 18. The drone 10 is depicted as flying along a path P1. The drone 10 includes a multispectral camera 14. The method may include capturing flight images of the field of crops 12, while flying, using the multispectral camera 14. The captured flight images may be transmitted to the remote operator R in the form of visible light images suitable for the remote operator R to view the images to fly the drone 10 as desired. In such a case the captured flight images would be streamed for immediate real-time display on hardware used by the remote operator R for normal flight operations.

It is contemplated that the visible light images may also include higher resolution images, and still images. These higher resolution images may be used to survey and scout the field of crops 12. Various dimensions and borders of the field of crops 12 may be determined and correlated to a map of the region. Such a map may be electronically stored in a computer software system and the correlation may be manually correlated or via computer processing or a combination. It is contemplated that GPS technology on-board the drone 10 may be used. Such computer software system may be separate from or integrated with the drone software and related hardware mentioned above.

The captured flight images may be based upon visible light images and infrared images. A Normalized Difference Vegetation Index (NDVI) map may be produced using the captured flight images. This may be produced according to those techniques which are well known to one of ordinary skill in the art. Having produced such a NDVI map, the NDVI map may be analyzed by the remote operator R who may identify areas of various degrees of crop grow as indicated by various degrees of biomass. Such identified areas may then be selectively targeted for further exploration by the drone 10. Further, a thermal map may be produced which may be desired, such as to determine fire risks.

The multispectral camera 14 may be chosen from those which are well known in the art. It is contemplated that the multispectral camera 14 may be configured as a single unit or as more than one unit, comprising several cameras associated with various wavelength ranges across the electromagnetic spectrum. Moreover, while the multispectral camera 14 is depicted as being mounted on a gimbal 22, the multispectral camera 14 may be mounted and utilize hardware to facilitate changes in viewing angle as may be chosen from those which are well known to one of ordinary skill in the art.

The processing of images and data obtained and captured by the multispectral camera 14 may be according to any of those techniques and utilize software, firmware and hardware as may be chosen from those which are well known to one of ordinary skill in the art. In this regard, some of the images and data obtained and captured by the multispectral camera 14 may be pre-processed on-board the drone 10 or downloaded or transmitted from the drone 10. The remote operator R may be provided with a remote control station or instrumentation that may electronically receive transmitted images and data while the drone 10 is deploy and/or download from the drone 10 at some later time.

Figure 4:
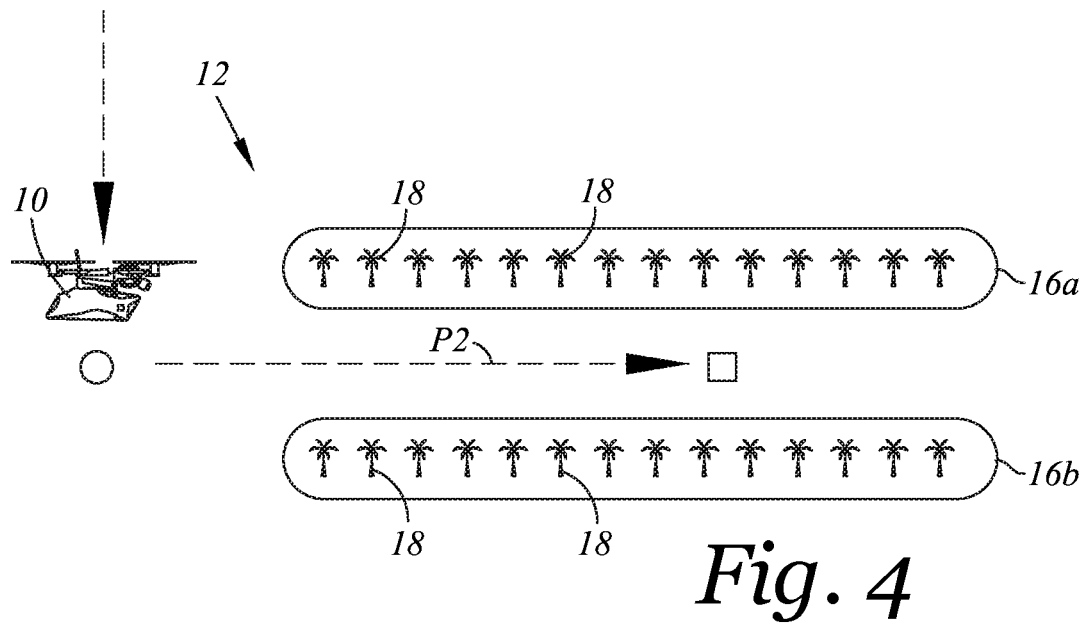
FIG. 4 is a top symbolic view of a portion of the field of crops of FIG. 1 with the drone having landed at position A.

The method further includes remotely controlling the drone 10 to land the drone adjacent the field of crops 12. Referring now to FIG. 4 there is depicted a top symbolic view of a portion of the field of crops 12 of FIG. 1 with the drone 10 having landed at position between the end of the rows 16a and 16b. The location for landing may be based upon the NDVI map. For example, the analysis of the NDVI map may indicate that this region of the field of crops 12 has low growth and therefore should be investigated.

It is contemplated that the drone 10 is configured to be driven along the terrain at the field of crops 12. The drone 10 may be driven from the landing location A along a path P2 to a desired location B. In the embodiment depicted, the drone 10 features a pair of tracks 20 that allow the drone 10 of be maneuvered on the ground. Other configurations may be implemented, such as use of wheels and rollers. In any event, the mechanical arrangement for driving the drone 10 upon the ground may be chosen from any of those which are well known to those of ordinary skill in the art, and the specific selection is contemplated to consider the nature of the ground conditions, such as whether the ground is relatively hard and compact, muddy, etc.

Figure 5:
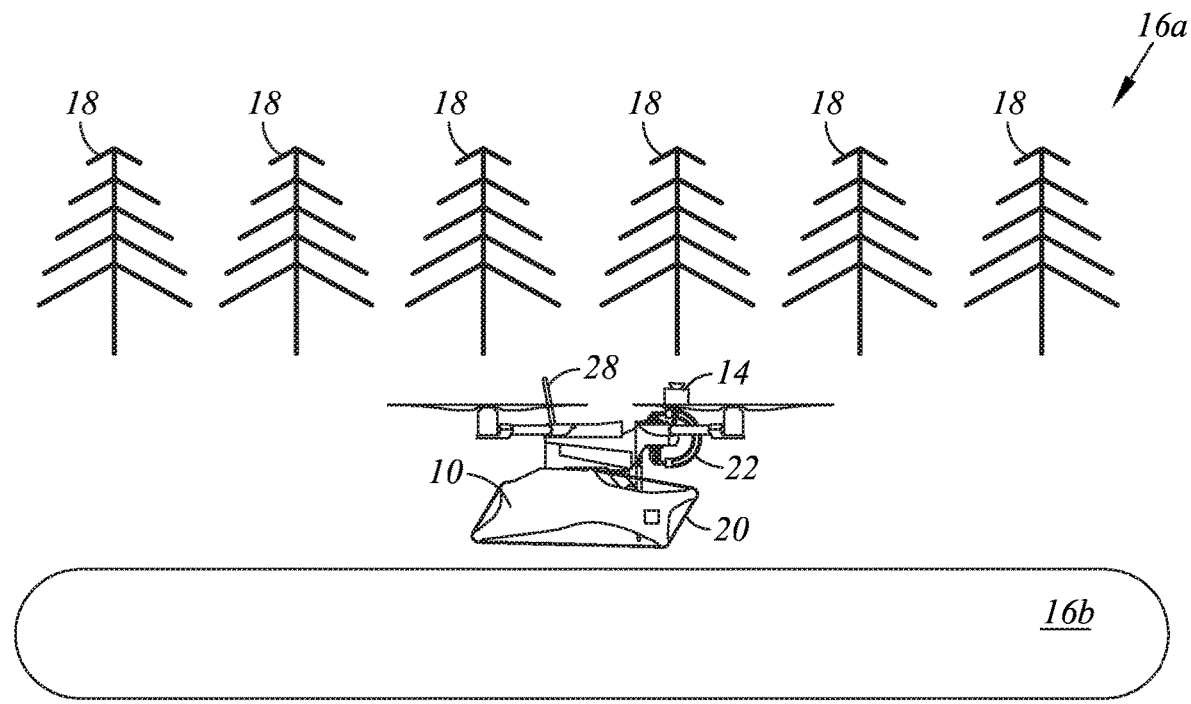
FIG. 5 is a symbolic side view of the drone adjacent a row of crops.

Referring now to FIG. 5 there is a symbolic side view of the drone 10 having been driven along the path P2 to arrive at the location B between the rows 16a and 16b. In this regard, the method further includes remotely controlling the drone 10 to drive the drone 10 on the ground along the field of crops 12. While driving along, the multispectral camera 14 may be used to capture ground-based images which may include video images. Such video images may be recorded for later play back and analysis. As the drone 10 is on the ground, it is contemplated that it is in a position to investigate the individual crops 18 from a unique perspective which allows for the efficient collection of data not otherwise readily available or readily accessible to a flying drone or physical operator walking the field of crops 12.

Figure 6:
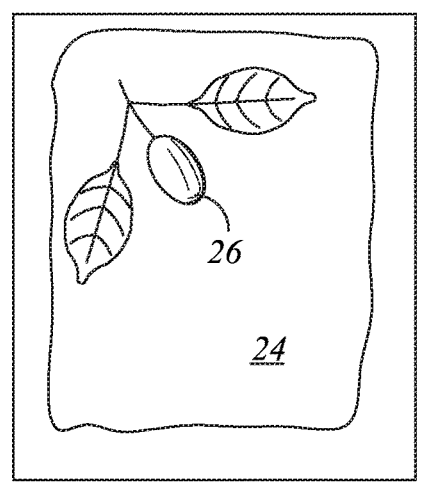
FIG. 6 is a symbolic image as captured by a multispectral camera on-board the drone.

The method further includes capturing ground-based images of the crops 18 at an upward view angle using a multispectral camera 14 on-board the drone 10. The method may include rotating the multispectral camera 14, such as using the gimbal 22, to position the multispectral camera 14 to view the individual crops 18 from a bottom view looking upward at an upward view angle. As the drone 10 is positioned below a canopy of the crops 18, portions of crops 18 may be observed that cannot be observed from an overhead aerial view. Once rotated, the multispectral camera 14 will may capture the ground-based images. The captured ground-based images may be based upon visible light images and thermal images. The images may be transmitted for display and observation by the remote operator R. In addition, the images may be recorded for later analysis. For example, a high quality visible light image may be magnified for visual observation of indications of plant disease (such powdery mildew) or pest issues (such as detection of leafhoppers or mealy bugs). Referring to FIG. 6 there is depicted a symbolic image 24 as captured by a multispectral camera on-board the drone 10. The image may be analyzed for identification of the crops 18, such as fruit 26, which can be evaluated for ripeness, quality, size and fruit count.

The method may further include using the captured ground-based images to determine a temperature value of the identified crops 18. In this regard, the multispectral camera 14 may be used to capture thermal images. The thermal images may be used to determine the temperatures of the crops 18. This may include determining the temperatures of specific portions of the crops 18, such as the leaves and the fruit.

Figure 7:
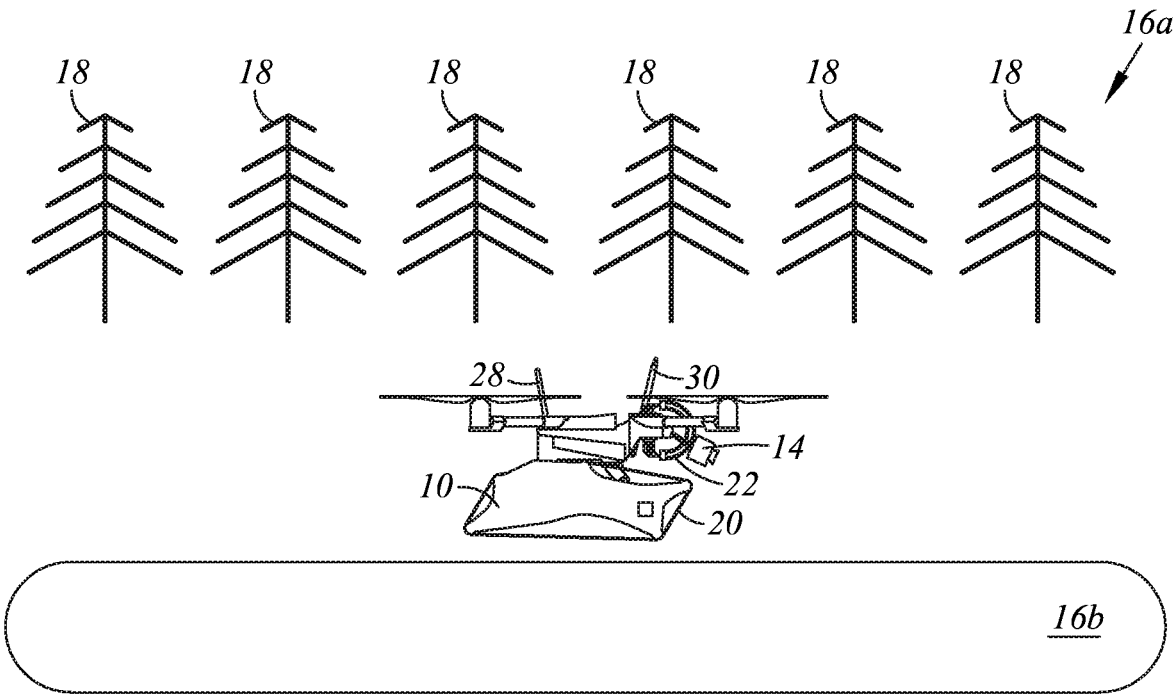
FIG. 7 is a symbolic side view of the drone of adjacent a row of crops with sensors deployed.

Referring to FIG. 7 there is depicted a symbolic side view of the drone 10 adjacent a row of crops 16 with an on-board sensor 28 being deployed in an upward facing position. For example, the on-board sensor 28 may be a hygrometer that is used to determined humidity within the canopy of the crop 18. Using spectroscopic techniques, the sensor 28 may be configured to measure a sugar content (brix) of identified fruit 26 (such as a grape) by positioning the on-board sensor adjacent the fruit 26. It is contemplated that the on-board sensor 28 may be chosen from any of those which are well known to one of ordinary skill in the art and data collected from the on-board sensor 28 may be processed according to any of those techniques which are also well known to one of ordinary skill in the art.

Figure 8:
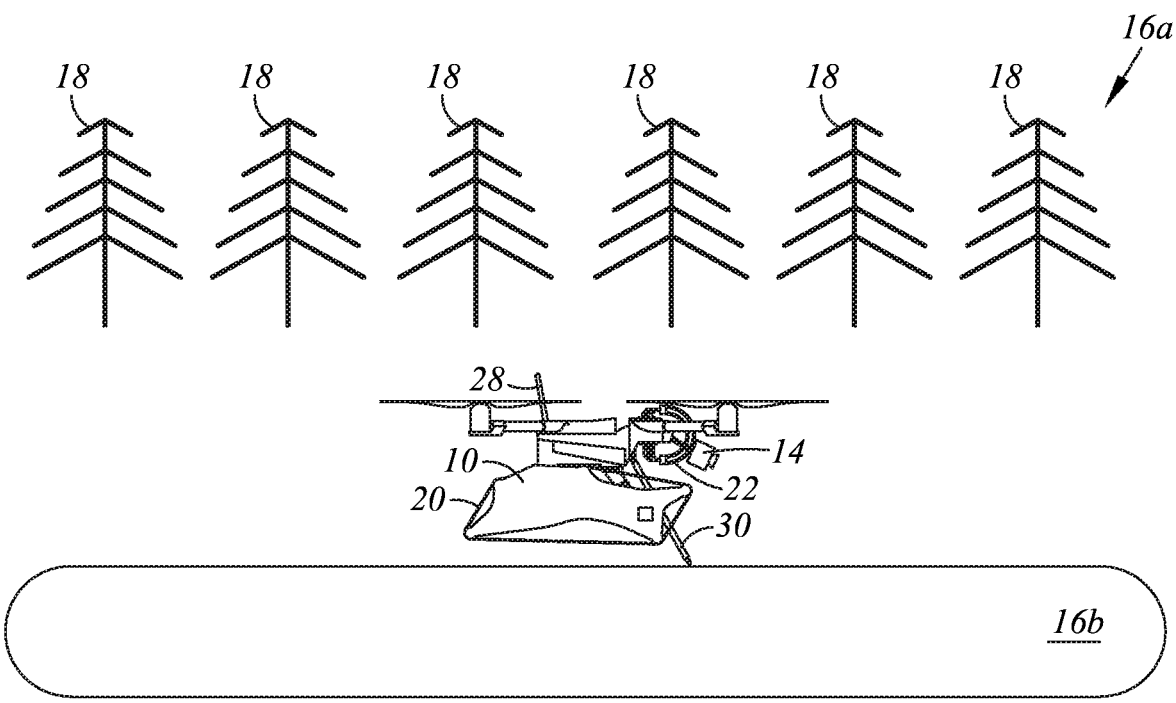
FIG. 8 is a symbolic side view of the drone of adjacent a row of crops with a ground probe deployed.

Referring now to FIG. 8 there is depicted a symbolic side view of the drone 10 adjacent a row of crops 16 with a ground probe 30. The ground probe 30 may be deployed from the drone 10 to investigate the ground. The method may further include sensing an environmental characteristic of the ground adjacent the crops 18 by deploying the ground probe 30 into the ground from on-board the drone 10. The environmental characteristic may be a pH value or a moisture value. It is contemplated that the ground probe 30 may be chosen from any of those which are well known to one of ordinary skill in the art and data collected from the ground probe 30 may be processed according to any of those techniques which are also well known to one of ordinary skill in the art.

Figure 9:
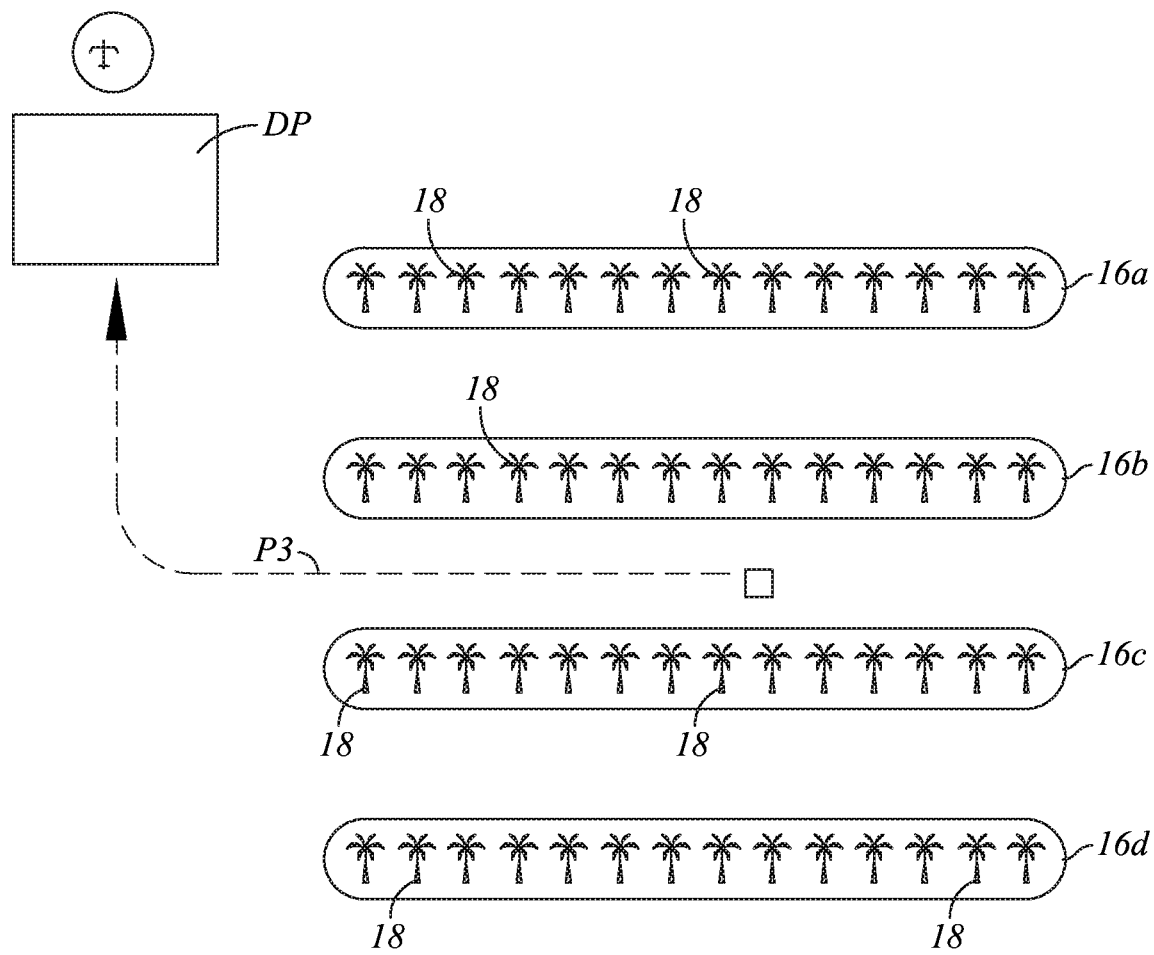
FIG. 9 is a symbolic top view of a portion of the field of crops of FIG. 1 indicating a drone path from a location B to a parking location with the remote operator R.

Referring now to FIG. 9 there is depicted a symbolic top view of a portion of the field of crops 12 of FIG. 1 indicating a drone path P3 from a location B to a drone parking location DP adjacent the remote operator R. At such a location, the remote operator R may service the drone 10, electrically charge or change our batteries, retrieve samples, and download collected data and images (to the extent not already transmitted).

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of analyzing a field of crops using a drone, the method comprising the steps of:
   a) remotely controlling the drone to fly the drone adjacent the field of crops;
   b) remotely controlling the drone to land the drone adjacent the crops;
   c) remotely controlling the drone to drive the drone on the ground along the crops; and
   d) capturing ground-based images of the crops at an upward view angle using a multispectral camera on-board the drone.

2. The method of claim 1 wherein step a) further includes capturing flight images of the field of crops, while flying, using the multispectral camera.

3. The method of claim 2 wherein the captured flight images are based upon visible light images.

4. The method of claim 2 wherein the captured flight images are based upon infrared images.

5. The method of claim 2 wherein step a) further includes producing a Normalized Difference Vegetation Index (NDVI) map using the captured flight images.

6. The method of claim 5 wherein step b) further includes remotely controlling the drone to land the drone adjacent the crops at a location based upon the NDVI map.

7. The method of claim 2 wherein step a) further includes transmitting the captured flight images.

8. The method of claim 1 wherein step d) includes rotating the multispectral camera to an upward view angle.

9. The method of claim 1 wherein the captured ground-based images are based upon visible light images.

10. The method of claim 1 wherein the captured ground-based images are based upon thermal images.

11. The method of claim 1 wherein the captured ground-based images are based upon visible light images and thermal images.

12. The method of claim 1 further includes using the captured ground-based images to identify crops.

13. The method of claim 12 further includes using the captured ground-based images to determine a temperature value of the identified crops.

14. The method of claim 1 further includes
   e) sensing a humidity value of the crops.

15. The method of claim 14 wherein step e) includes sensing the humidity value of the crops using a hygrometer on-board the drone.

16. The method of claim 1 wherein the crops are arranged in rows, step c) includes controlling the drone to drive the drone on the ground along a row of the crops.

17. The method of claim 16 wherein step d) wherein the captured ground-based images include video images.

18. The method of claim 1 further includes the step of:
f) sensing an environmental characteristic of the ground adjacent the crops by deploying a ground probe into the ground from on-board the drone.

19. The method of claim 18 wherein the environmental characteristic is a pH value.

20. The method of claim 18 wherein the environmental characteristic is a moisture value.

21. A method of analyzing a field of crops using a drone, the method comprising the steps of:
a) remotely flying the drone to fly the drone adjacent the field of crops;
b) capturing flight images of the field of crops, while flying, using a multispectral camera;
c) remotely landing the drone adjacent the crops;
d) remotely driving the drone on the ground along the crops;
e) rotating the multispectral camera to an upward view angle; and
f) capturing ground-based images of the crops at an upward view angle using the multispectral camera on-board the drone.

22. The method of claim 21 wherein the captured flight images are based upon visible light images and infrared images.

23. The method of claim 21 wherein the captured ground-based images are based upon visible light images and thermal images.

24. The method of claim 21 further includes the step of:
g) sensing an environmental characteristic of the ground adjacent the crops by deploying a ground probe into the ground from on-board the drone.

25. The method of claim 24 wherein the environmental characteristic is a pH value.

26. The method of claim 24 wherein the environmental characteristic is a moisture value.

* * * * *